United States Patent
Grün et al.

(10) Patent No.: US 6,759,497 B2
(45) Date of Patent: Jul. 6, 2004

(54) MODIFIED POLYMERS WITH A HIGH PROPORTION OF CIS-POSITION DOUBLE BONDS

(75) Inventors: Michael Grün, Siegburg (DE); Thomas Knauf, Dormagen (DE); Wilfried Braubach, Solingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 89 days.

(21) Appl. No.: 10/125,111

(22) Filed: Apr. 18, 2002

(65) Prior Publication Data

US 2003/0069365 A1 Apr. 10, 2003

(30) Foreign Application Priority Data

Apr. 23, 2001 (DE) .......................... 101 19 745
Oct. 18, 2001 (DE) .......................... 101 51 391

(51) Int. Cl.$^7$ ............................. C08F 236/10
(52) U.S. Cl. .................. 526/340; 526/335; 526/336
(58) Field of Search ................ 526/340, 336, 526/335, 344

(56) References Cited

U.S. PATENT DOCUMENTS

| | | | |
|---|---|---|---|
| 3,925,511 A | 12/1975 | Loveless | 260/877 |
| 3,978,161 A | 8/1976 | Nielsen et al. | 260/877 |
| 4,761,456 A | 8/1988 | Lund et al. | 525/331.7 |
| 6,344,524 B1 * | 2/2002 | Robert et al. | 525/370 |

FOREIGN PATENT DOCUMENTS

| | | |
|---|---|---|
| CA | 1 143 711 | 3/1983 |
| CA | 2316452 | 2/2001 |
| CA | 2324174 | 4/2001 |
| GB | 1173508 | 12/1969 |
| WO | 02/16448 | 2/2002 |

OTHER PUBLICATIONS

Journal of Organometallic Chemistry, 451 (month unavailable) 1993, pp. 67–72, Giovanni Ricci and Salvatore Italia, "Polymerization of 1,3–dienes with the soluble catalyst system methylaluminoxanes–[CpTiCl$_3$]. Influence of monomer structure on polymerization stereospecificity".

Makromol. Chem. Rapid Commun. 11, (month unavailable) 1990, pp. 519–524, Leone Oliva, Pasquale Longo, Alfonso Grassi, Paolo Ammendola, "Polymerization of 1,3–alkadienes in the presence of Ni– and Ti–based catalytic systems containing methylalumoxane".

* cited by examiner

*Primary Examiner*—Robert D. Harlan
(74) *Attorney, Agent, or Firm*—Joseph C. Gil; Jennifer R. Seng

(57) ABSTRACT

The present invention relates to polymers that are modified along the polymer chain and are based on conjugated dienes or conjugated dienes and vinyl-aromatic compounds having a content of vinyl-aromatic compounds of up to 60 wt. %, a content of cis-position double bonds of $\geq 92\%$, a mean molecular weight of 50,000 to 1,500,000 g/mole and a gel content of $\leq 5\%$. The polymers according to the invention can be used for the production of all types of molded articles, wherein in particular their technical and physical properties are improved compared with the prior art.

4 Claims, No Drawings

MODIFIED POLYMERS WITH A HIGH PROPORTION OF CIS-POSITION DOUBLE BONDS

FIELD OF THE INVENTION

The present invention relates to polymers based on conjugated dienes or on conjugated dienes and vinyl aromatic compounds that are modified by polar groups along the polymer chain and contain a high proportion of cis-position double bonds.

It is known to modify polymers with organic compounds that contain in the molecule at least one polar group and a group capable of reacting with the polymer anions. The modification of the polymers is normally carried out by first of all metallizing polymers that contain active hydrogen atoms and then reacting them with the aforementioned organic compounds. Reference may be made in this connection to U.S. Pat. No. 3,925,511, U.S. Pat. No. 4,761,456 as well as U.S. Pat. No. 3,978,161. The polymers modified according to the prior art are preferably used in tire manufacture in order to improve the interaction of the fillers present in the tires with the rubber. A disadvantage of the use of such modified polymers, that have a small content of cis-position double bonds due to the method of their production is that they can be incorporated only with difficulty into rubber mixtures and that the mechanical/dynamical property profile of the rubber molded articles produced thereby is adversely affected compared to the normally used, unmodified polymers such as polybutadienes.

EP 1 022 291 A1 describes modified diene elastomers which, despite having a high cis-content, have a very high gel content due to the method of their production. In addition, the diene elastomers described in EP 1 022 291 A1 are not modified along the chain, but are modified special organosilicon compounds at the end group.

British Patent Application GB 1173508 A discloses the production of homopolymers or copolymers, by, for example, ionic polymerization, and the functionalization thereof, with corresponding organic compounds containing functional groups. The homopolymers or copolymers produced according to this reference have a cis-1,4 content of about 92%. The gel content is higher than 5 wt. % and thus greatly restricts the practical use of such polymers.

SUMMARY OF THE INVENTION

Accordingly, the object of the present invention is to obviate the disadvantages of the hitherto used modified polymers, i.e. to improve their ability to be incorporated into rubber mixtures and to improve the mechanical/dynamical properties of the rubber molded articles produced, as well as their gel content.

The aforementioned disadvantages in the production of rubber molded articles using known modified polymers can now be obviated if modified polymers, that are modified along their polymer chain, i.e. not at their chain end, are used based on conjugated dienes or on conjugated dienes and vinyl-aromatic compounds that contain, inter alia, a high proportion of cis-position double bonds and have a low gel content.

Accordingly, the present invention provides modified polymers, which are modified along their polymer chain and are based on conjugated dienes or on conjugated dienes and vinyl aromatic compounds and have a content of vinyl-aromatic compounds of up to 60 wt. %, a content of cis-position double bonds of $\geq 92\%$, a mean molecular weight ($M_w$) of 50,000 to 1,500,000 g/mole, a gel content of $\leq 5\%$ and a degree of modification of 0.05 to 20 wt. %.

DETAILED DESCRIPTION OF THE INVENTION

The modified polymers according to the present invention have a content of cis-position double bonds of preferably $\geq 95\%$, and in particular $\geq 97\%$, based on the proportion of conjugated dienes in the molecule.

The modified polymers according to the present invention have a mean molecular weight ($M_w$) (determined by GPC= gel permeation chromatography) of preferably 200,000 to 700,000 g/mole. The glass transition temperature ($T_G$) is $-90°$ to $-110°$ C. and preferably, $-95°$ to $-108°$ C., as determined by DSC.

Suitable conjugated dienes are, for example, 1,3-butadiene, isoprene, piperylene, 1,3-hexadiene, 1,3-octadiene as well as 2-phenyl-1,3-butadiene; 1,3-butadiene is preferred.

Vinyl aromatic compounds which may be copolymerized with the conjugated dienes are, for example, styrene, p-methylstyrene, α-methylstyrene, 3,5-dimethylstyrene, vinylnaphthalene, p-tert.-butylstyrene, divinylstyrene and diphenylethylene; styrene is preferred. The proportion of vinyl aromatic monomers copolymerizable with the conjugated dienes in the corresponding copolymers is preferably 10 to 45 wt. %.

The modified polymers according to the present invention have a gel content of $\leq 3\%$, preferably $\leq 1\%$, as determined according to ASTM D3616-95 (Standard Test Method for Rubber, Raw-Determination of Gel, Swelling Index, and Dilute Solution Viscosity).

The degree of modification, of the modified polymers according to the present invention, is about 0.08 to 5 wt. %, preferably 0.1 to 2 wt. %, as determined by elemental analysis of the organic compounds used for the modification, that contain polar groups containing elements of main groups III, IV, V, VI or VII of the periodic system of the elements (PSE).

The present invention also relates to a process for producing polymers that are modified along the polymer chain and are based on conjugated dienes or on conjugated dienes and vinyl aromatic compounds and that have the above-mentioned contents of vinyl aromatic compounds, the above-mentioned proportion of cis-position double bonds and the above-mentioned mean molecular weight, gel content and degree of modification, wherein (a) the conjugated dienes or the conjugated dienes and vinyl-aromatic compounds are polymerized at temperatures of $-30°$ to $130°$ C., in the presence of rare earth metal compounds, and in the presence of an inert, aliphatic solvent, the water content of the reaction mixture being ≦1,000 ppm, and preferably 500 ppm, (b) the resulting polymers containing about 1.0 to 1,000, preferably 1.5 to 100, and more preferably about 2 to 30, mmole/100 g of polymer of active hydrogen atoms are reacted with 0.1 to 200 mmole, based on 100 g of polymer, of organometallic compounds or with the metals themselves, the metals of the organometallic compounds being selected from the group of alkali metals or alkaline earth metals, in the presence of 0.1 to 200 mmole, based on 100 g of polymer, of compounds capable of forming co-ordinate bonds with the metallized polymer anions, at temperatures of 20° to 200° C. and (c) at temperatures of 0° to 200° C., the stabilized polymer anions obtained are reacted with 0.01 to 200 mmole, based on 100 g of polymer, of organic compounds that contain a group capable of reacting with the polymer anions and at least one polar group in the molecule, wherein the polar groups contain elements of main groups III, IV, V, VI or VII of the PSE or combinations thereof, and the groups capable of reacting with the polymer anions are selected from carbonyl groups, acid chloride groups, metal halide groups, sulfenyl groups, sulfonyl groups, aminochloride groups, groups containing reactive double bonds, epoxide groups, isocyanate groups, nitrile groups and organosilicon and organotin groups, in the presence of aprotic, organic solvents.

Suitable organic compounds that preferably contain in the molecule 1 to 5 polar groupings or groups and only one grouping or group that is capable of reacting with the polymer anions and that are suitable for modifying the aforementioned polymers, are preferably those containing boron, silicon, carbon, tin, nitrogen, oxygen, sulfur, fluorine, chlorine and bromine, and in particular silicon, tin, nitrogen, oxygen and chlorine in the polar groups.

The following are, for example, suitable as polar groups: hydroxyl groups, carboxyl groups, amino groups, ester groups, carbonyl groups, halogens, epoxide groups, ether groups, nitrile groups, thioether groups, sulfonic acid ester groups, phosphoric acid and phosphorous acid ester groups, ammonium groups, organotin groups, as well as organosilicon groups, such as open-chain or cyclic siloxane or silane groups. Preferred are ester groups, ammonium groups, amino groups as well as the aforementioned organosilicon and organotin groups. Most preferred are organotin groups, amino groups as well as open-chain or cyclic siloxane or silane groups.

The following groupings or groups capable of reacting with the polymer anions may be mentioned as examples: aldehyde and keto groups, sulfonic acid chloride and phosphoric acid chloride groups, silicon chloride groups, tin chloride groups, epoxide groups, isocyanate groups, open-chain or cyclic siloxane groups, and organotin groups. The following are preferred: sulfenyl chloride groups, aldehyde and keto groups, epoxide groups, carboxylic acid chloride groups, isocyanate groups, open-chain or cyclic siloxane groups and alkyltin halide groups.

Organic compounds that are capable of modifying the polymers are those in which one or more polar groups are formed during the reaction with the polymer anions. Such organic compounds include, for example, those containing epoxide groups, aldehyde and keto groups, carboxyl groups, isocyanate groups and silane groups, such as for example epoxidized soy bean oil, epoxidized siloxanes, such as, 3-glycidyl-oxypropyl-pentamethyldisiloxane, epoxidized silanes, such as, 2-(3,4-epoxidecyclohexyl)-ethyltrimethoxysilane, phenylethylene oxide, epichlorohydrin, ethylene oxide, 1,2-epoxy-cyclopentane, p-dimethyl-benzaldehyde, butyl isocyanate, ethyl isocyanate, cyclohexyl isocyanate, 3-isocyanatopropyltriethoxysilane and 2-isocyanatoethylmethyl acrylate.

In particular, the following may be mentioned as organic compounds that contain in the molecule at least one polar grouping and only one grouping capable of reacting with the polymer anions, or that form one or more polar groups during the reaction with the polymer anions: morpholine-N-carboxylic acid chloride, N,N-dimethylcarbamic acid chloride, epichlorohydrin, 3-isocyanatopropyltriethoxysilane, propylene oxide, butyl isocyanate, 3-glycidyloxypropylpentamethyl disiloxane, carbon dioxide, dimethylaminoethyl acrylate, vinylimidazole as well as tri-n-butyltin chloride. Obviously, the aforementioned compounds may also be used in the form of mixtures with one another.

The amount of organic compounds that are used for the modification of the polymers is governed, in particular, by the desired interaction between the filler and rubber that is present. Depending on the respective polarity of the groupings present in the organic compounds, even a few polar groups or groupings can effect a detectable interaction with the fillers. Accordingly, in practice, even one polar group in the modified polymer may be sufficient to effect a noticeable interaction with the fillers. Therefore, this means that the amounts of polar organic compounds that are used may be varied in a wide range. Normally, in practice, the organic compounds are used in amounts of 0.05 to 100 mmole, and preferably 0.1 to 50 mmole, with respect to 100 g of polymer.

As mentioned, according to the present invention the polymerization of the monomers used for the synthesis of the polymers is carried out in the presence of rare earth metal catalysts. The use of rare earth metal catalysts in the polymerization is important for the modification of the metallized polymer anions according to the present invention, since with these catalysts certain physical properties be obtained that help to solve the problems of the prior art.

The rare earth metal catalysts used are rare earth metal compounds such as cerium, lanthanum, praseodymium, gadolinium or neodymium compounds that are soluble in hydrocarbons. Preferably, the corresponding salts of the rare earth metals are used as catalysts, such as neodymium carboxylates, and in particular neodymium neodecanoate, neodymium octanoate, neodymium naphthenate, neodymium 2,2-diethyl hexanoate, neodymium 2,2-diethylheptanoate, and the corresponding salts of lanthanum or praseodymium. Neodymium neodecanoate is preferred.

The above-mentioned rare earth metal catalysts are known and described, for example, in German Patent Application No.19 951 841.6 and in DE-A 28 48 964 and DE-A 26 25 390.

In a preferred embodiment, the polymerization of the unsaturated monomers is carried out in the presence of a rare earth metal catalyst system, as described in German Patent Application No.19 951 841.6.

According to the aforementioned German Patent Application, a catalyst system is used based on rare earth metal compounds, comprising a) a rare earth metal compound,
b) an organic aluminum compound,
c) a trihalosilane of the formula

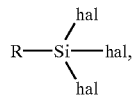

wherein
hal denotes fluorine, chlorine and bromine, and
R denotes hydrogen or a vinyl group,
wherein the components a):b):c) are present in a non-aqueous form (water content: ≦1,000 ppm, preferably ≦500 ppm, based on a 20 wt. % solution of component a) in an inert aliphatic solvent) in a ratio of 1:(0.5 to 5):(0.05 to 0.5.)

The rare earth metal compounds previously mentioned are used as component a) of the aforementioned catalyst system based on rare earth metal compounds; suitable for use as the organic aluminum compound (component b) are in particular aluminum alkyls and aluminum alkyl hydrides in which the alkyl group contains 1 to 10, preferably 1 to 6, carbon atoms. The aluminum alkyl hydrides can contain one or two alkyl groups. Those preferred are: aluminum triethyl, diisobutylaluminum hydride, aluminum triisobutyl, and most preferably diisobutylaluminum hydride. Trichlorosilane is preferably used as the trihalosilane (component c).

According to the present invention, preferred catalyst systems are those based on rare earth metal compounds in which the components a):b):c) are present in a weight ratio of 1:(1 to 2):(0.1 to 0.4), and the component a) is neodymium versatate, the component b) is diisobutylaluminum hydride and component c) is trichlorosilane.

The metallization of the polymers that are obtained by polymerization using rare earth metals and that contain the above-mentioned amount of active hydrogen atoms in the molecule is carried out by reacting the polymers with suitable organometallic compounds in the presence of reagents capable of forming co-ordinate bonds.

Organometallic compounds for the metallization, which may be used, are all organometallic compounds known from the prior art, including the metals themselves. Alkali metal organic compounds or alkaline earth metal organic compounds or the metals on which they are based are preferably used as organometallic compounds, lithium or corresponding organic compounds thereof are preferred. More preferred are organolithium compounds represented by the formula R-Li, in which R denotes a hydrocarbyl radical with 1 to 20 C atoms. Preferably, such monofunctional organolithium compounds contain 1 to 10 C atoms. The following may be mentioned by way of example: methyllithium, ethyllithium, isopropyllithium, n-butyllithium, sec.-butyllithium, n-octyllithium, tert.-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium and/or 4-cyclohexylbutyllithium. Preferred are ethyllithium, isopropyllithium, n-butyllithium, sec.-butyllithium, n-hexyllithium, tert.-octyllithium, phenyllithium, 2-naphthyllithium, 4-butylphenyllithium, and/or cyclohexyllithium. n-butyllithium and/or sec.-butyllithium are most preferred.

The amount of organometallic compounds or metals to be used for the metallization reaction depends, in particular, on the active hydrogen atoms contained in the polymers that are obtained, and it is preferably 0.05 to 100, and in particular 0.1 to 50 mmole, based on 100 g of polymer. The optimal amount of organometallic compounds or metals may easily be determined by preliminary experiments.

In order to stabilize the metallized polymers and/or polymer anions, the metallization is carried out in a known manner in the presence of reactants capable of forming co-ordinate bonds. Such reagents capable of forming co-ordinate bonds are also known from the prior art discussed hereinbefore.

Suitable reactants include tertiary diamines with three saturated aliphatic hydrocarbon radicals, cyclic diamines or bridged diamines. Preferred are tetramethylethylenediamine, tetraethylethylenediamine, tetradecylethylenediamine, tetraalkyl-1,2-diaminocyclohexane, tetraalkyl-1,4-diaminocyclohexane, piperazines, N,N'-dimethylpiperazine as well as sparteine or triethylenediamine. The aforementioned amines may be used individually or in mixtures with one another.

Furthermore, the known alkali metal alkoxides as well as the alkali metal phenoxides or crown polyethers may be used as reagents capable of forming co-ordinate bonds. There may be mentioned, in particular, potassium tert.-amyl oxide, sodium tert.-amyl oxide and/or potassium tert.-butyl oxide.

The amount of reactants to be used capable of co-ordinate bonding is 0.05 to 100 mmole, and preferably 0.1 to 50 mmole, based on 100 g of polymer.

The polymerization of the aforementioned unsaturated monomers in the presence of the aforementioned catalysts is normally carried out at temperatures in the range from about 20° to 100° C., optionally under elevated pressure (2 to 10 kPa).

It is usual to carry out a polymerization in the presence of inert, aliphatic solvents such as pentanes, hexanes, heptanes, methylcyclopentane or cyclohexane. With these aliphatic solvents both the straight-chain as well as their branched isomers are suitable. Furthermore, there may also be used aromatic solvents such as benzene, toluene or ethylbenzene. The solvents may be used individually as well as in the form of mixtures with one another; the optimum mixing ratio can easily be determined by suitable preliminary experiments.

The amount of solvent in the process according to the present invention is normally 1000 to 100 g, preferably 500 to 150 g, with respect to 100 g of the total amount of monomer used. Obviously, it is also possible to polymerize the monomers used in the absence of solvents.

The polymerization according to the present invention of the unsaturated monomers may be carried out in the presence of the aforementioned catalysts may be carried out up to the complete conversion of the monomers employed. Obviously, it is also possible to interrupt the polymerization prematurely depending on the desired polymer properties, for example, at a conversion of about 80% of the monomers.

The polymerization according to the present invention of the unsaturated monomers is preferably carried out in the presence of the catalysts in such a way that only a residual content of employed monomers in the polymer mixture of at most 0.5 wt. %, preferably less than 500 ppm, remains.

In the production according to the present invention of the unsaturated polymer anions, it is possible first of all to isolate, purify and work up in a known manner the polymers obtained from the polymerization of the unsaturated monomers in the presence of the catalysts, and then to subject the isolated polymers to a metallization reaction.

Furthermore, it is possible to metallize directly, i.e. in situ, the polymers obtained in the polymerization. It is preferred to carry out the metallization in situ.

The metallization reaction is preferably carried out at temperatures in the range from 40° to 120° C., in the presence of the inert solvents mentioned above.

For example, the polymer anions metallized according to the present invention may be produced as follows:

The monomers to be polymerized and the corresponding solvent are placed in an autoclave provided with a stirrer, following which the rare earth metal catalyst is metered into the solution. The autoclave is made inert beforehand by flushing with an inert gas such as nitrogen. After the desired degree of conversion has been reached, the polymer obtained is preferably metallized in situ by reaction with reactants capable of coordinate bonding, in the presence of the aforementioned organometallic compounds. When operating in situ and with a monomer conversion that is not complete, it is advantageous if the unreacted monomers are removed from the polymer mixture beforehand, i.e. before the metallization reaction. The production of such metallized polymer anions is described in DE-A 10 041 195.

According to the process in accordance with the present invention, the metallized polymer anions thus obtained are reacted with organic compounds that contain in the molecule at least one polar group and a group capable of reaction with the polymer anions, in the presence of aprotic organic solvents.

The following may be mentioned as examples of aprotic organic solvents: pentanes, hexanes, heptanes, cyclohexane, methylcyclopentane, benzene, toluene, ethylbenzene, preferably hexanes, cyclohexane, toluene and most preferably hexane.

The amount of aprotic organic solvents may easily be determined by appropriate preliminary experiments and is usually 100 to 1000 g, preferably 150 to 500 g, with respect to 100 g of the total amount of employed monomer.

The reaction of the metallized polymer anions with the aforementioned organic compounds is preferably carried out at temperatures from 20° C. to 120° C.

The reaction of the organic compounds with the metallized polymer anions is usually carried out in situ without intermediate isolation of the metallized polymer anions.

The organic compounds used for the modification are employed in the amounts mentioned hereinbefore.

The working up of the modified polymers is carried out, for example, by adding water and/or alcohols or mixtures of alcohols and water to the reaction mixture, whereupon the modified polymers precipitate out. The modified polymers are then isolated in a conventional way, for example by filtration.

In the isolation of the modified polymers, it is normal to stabilize the latter by the addition of suitable stabilizers, for example by adding Irganox® 1520, in amounts usual for this purpose.

The modified polymers according to the invention can be mixed with other modified or non-modified rubbers, such as SSBR, hoch-cis BR and LiBR, in order to obtain particularly advantageous physical and technical properties in the rubber molded articles to be produced. The most advantageous mixing ratio can readily be determined by corresponding preliminary experiments. The aforementioned rubbers are normally used in amounts of 5 parts by weight to 60 parts by weight, with respect to 100 parts by weight of the polymers according to the invention.

In addition, the modified polymers according to the invention can also be mixed with conventional crosslinking agents, rubber auxiliaries and additives, such as mineral oil plasticizers, light-stability wax, anti-aging agents, vulcanization accelerators, silanes, sulfur and the normal reinforcing materials in the amounts known and normally used therefor. Reinforcing materials that may be mentioned include silica and carbon black, either separately or in the form of mixtures. Reference may be made in this connection, inter alia, to the corresponding articles in Handbuch der Gummiindustrie (Manual of the Rubber Industry), 2nd Edition, 1991, Editor: Bayer A G.

The present invention also provides for the use of the modified polymers for the production of all types of rubber molded articles, in particular for the production of tires and tire structural parts. Furthermore, the modified polybutadienes may, in particular, be used for the production of golf balls and impact-modified plastics materials, such as for example HIPS and ABS.

EXAMPLES

Example 1

1) Production of Lithium-Metallized Polybutadiene that has Been Obtained by Polymerization of Butadiene with Rare Earth Metal Catalysts 8,200 g of industrial hexane were added to an autoclave flushed with nitrogen and provided with a stirrer. 2 mmole of neodymium versatate, 22.0 mmole of diisobutylaluminum hydride and 1.9 mmole of trichlorosilane were next added while stirring to the hexane in the autoclave. 1,800 g of dried, destabilized 1,3-butadiene were then metered into this mixture. The polymerization of the 1,3-butadiene was carried out at a temperature of 60° C. up to the quantitative conversion of the monomer.

0.1 mole of dried N,N,N',N'-tetramethylethylenediamine and 0.1 mole of n-butyllithium were then added directly—in situ—to the polybutadiene thus obtained, and the mixture was stirred at a temperature of 100° C. for about 1 hour.

2) Reaction of the Metallized Polybutadiene Anion with Acid Chlorides

In each case, 0.2 mole of N,N-dimethylcarbamic acid chloride or morpholine—N—carboxylic acid chloride was added to the metallized polybutadiene anion obtained in 1) and the mixture was stirred for ca. 1 hour at 100° C. Following this, the reactor contents were cooled and the reaction was stopped with ethanol. The product obtained was then stabilized with Irganox® 1520 and dried at 60° C.

Analysis of the modified polymers obtained yielded the following data:

a) modified with dimethylcarbamic acid chloride
b) modified with morpholine-N-carboxylic acid chloride 8,200 g of industrial hexane were added to an autoclave flushed with nitrogen and provided with a stirrer. 2 mmole of neodymium versatate, 22.0 mmole of diisobutylaluminum hydride and 1.9 mmole of trichlorosilane were next added while stirring to the hexane in the autoclave. 1,800 g of dried, destabilized 1,3-butadiene were then metered into this mixture. The polymerization of the 1,3-butadiene was carried out at a temperature of 60° C. up to the quantitative conversion of the monomer.

0.1 mole of dried N,N,N',N'-tetramethylethylenediamine and 0.1 mole of n-butyllithium were then added directly—in situ—to the polybutadiene thus obtained, and the mixture was stirred at a temperature of 100° C. for about 1 hour.

a) Reaction of the Metallized Polybutadiene Anion with Epoxide Group-Containing Compounds 100 ml of epoxidized soybean oil (ESBO) were added to the metallized polybutadiene anion obtained in 1) and the mixture was stirred for about one hour at 100° C. The reactor contents were then cooled and the reaction was stopped with ethanol. The product obtained was then stabilized and dried at 60° C.

TABLE 1

|   | ML 1 + 4 ME | SV before modification mPas | SV after modification mPas | Microstructure cis % | trans % | vinyl % | $M_w$ g/mole | Mn g/mole | Polydispersity | DSC Tg ° C. | Elementary Analysis N ppm |
|---|---|---|---|---|---|---|---|---|---|---|---|
| a) | 46 | 488 | 174 | 97.0 | 1.8 | 1.2 | 633,490 | 183,126 | 3.5 | −104.7 | 230 |
| b) | 41 | 441 | 145 | 98.0 | 1.5 | 0.4 | 643,426 | 172,296 | 3.7 | −106.8 | 329 |

SV: Solution viscosity
The gel content of the modified polymers was 1%.

Example 2

1) Production of Lithium-Metallized Polybutadiene that has been Obtained by Polymerization of Butadiene with Rare Earth Metal Catalysts

TABLE 2

Analysis of the modified polymers obtained yielded the following data:

| ML 1 + 4 ME | SV before modification mPas | SV after modification mPas | Microstructure cis % | trans % | vinyl % | Mw g/mole | Mn g/mole | Polyd. | DSC Tg ° C. |
|---|---|---|---|---|---|---|---|---|---|
| 60 | 1587 | 378 | 98.5 | 1.0 | 0.5 | 790,128 | 244,375 | 3.20 | 100.7 |

SV: Solution viscosity b) Reaction of the Metallized Polybutadiene Anion with Epichlorohydrin 0.12 mole of epichlorohydrin was added to the metallized polybutadiene anion obtained in 1) and the mixture was stirred for about one hour at 100° C. The reactor contents were then cooled and the reaction was stopped with ethanol. The product obtained was then stabilized and dried at 60° C.

TABLE 3

Analysis of the modified polymer obtained yielded the following data:

| ML 1 + 4 ME | SV before modification mPas | SV after modification mPas | Microstructure | | | GPC | | | DSC | Elem. Anal. |
|---|---|---|---|---|---|---|---|---|---|---|
| | | | cis % | trans % | vinyl % | Mw g/mole | Mn g/mole | Polyd | Tg °C. | Cl % |
| 48 | 741 | 429 | 98.2 | 1.3 | 0.5 | 634,378 | 182,396 | 3.5 | −105.3 | 0.06 |

SV: Solution viscosity

Example 3

1) Production of Lithium-Metallized Polybutadiene that was Obtained by Polymerization of Butadiene with Rare Earth Metal Catalysts 2,046 g of industrial hexane were added to an autoclave flushed with nitrogen and provided with a stirrer. 0.5 mmole of neodymium versatate, 12.50 mmole of diisobutylaluminum hydride and 0.47 mmole of trichlorosilane were next added while stirring to the hexane in the autoclave. 450 g of dried, destabilized 1,3-butadiene were then metered into this mixture. The polymerization of the 1,3-butadiene was carried out at a temperature of 60° C. up to the quantitative conversion of the monomer.

12.5 mole of dried N,N,N',N'-tetramethylethylenediamine and 12.5 mole of n-butyllithium were then added directly—in situ—to the polybutadiene thus obtained, and the mixture was stirred at a temperature of 100° C. for about 1 hour.

a) Reaction of the Metallized Polybutadiene Anion with Compounds Containing Reactive Double Bonds 100 mmole of glycidyl methacrylate were added to the metallized polybutadiene anion obtained in 1) and the mixture was stirred for about one hour at 100° C. The reactor contents were then cooled and the reaction was stopped with ethanol. The product obtained was stabilized as described above and dried at 60° C.

The analysis of the modified polymers obtained yielded the following data:

0.027 mole of dried N,N,N',N'-tetramethylethylenediamine and 0.027 mole of n-butyllithium were added directly—in situ—to the polybutadiene thus obtained and the mixture was stirred at a temperature of 100° C. for about 1 hour.

a) Reaction of the Metallized Polybutadiene Anion with Morpholine-N-Carboxylic Acid Chloride.

0.055 mole of morpholine-N-carboxylic acid chloride was added to the polybutadiene anion produced in 1) and the mixture was stirred for about one hour at 100° C. The reactor contents were then cooled and the reaction was stopped with ethanol. The product obtained was then stabilized with about 3 g of 2,6-di-tert.-butyl-4-methylphenol and dried at 60° C. Analysis of the comparison polymer obtained yielded the following data:

TABLE 5

| 1, 4 proportion (wt. %) | 1, 2 proportion (wt. %) | Element. Anal. (nitrogen in ppm) | TG [° C.] | Mooney Visc. (M1 1 + 4, 100° C.) | Mol. Wt. (GPC, g/mole) |
|---|---|---|---|---|---|
| 92 | 7.8 | 101 | −85 | 53 | 283,000 |

The polybutadienes modified in the preceding examples were incorporated into mixtures that are typically used for the production of tire treads. Mixtures with silicic acid or with carbon black as filler were produced (for further details see the following Tables).

TABLE 4

| ML 1 + 4 ME | SV before modification mPas | SV after modification mPas | Microstructure | | | GPC | | | DSC |
|---|---|---|---|---|---|---|---|---|---|
| | | | cis % | trans % | vinyl % | Mw g/mole | Mn g/mole | Polyd. | Tg °C. |
| 41 | 827 | 554 | 97.0 | 1.8 | 1.2 | 584,330 | 171,862 | 3.4 | −104.9 |

SV: Solution viscosity

Example 4 (Comparison)

1) Production of Lithium-Metallized Polybutadiene that was Obtained by Polymerization of Butadiene with Anionic Catalysts 272 mg of sec.-BuLi (3.32 ml of a 1.3 molar solution in hexane) in 5270 g (8000 ml) of n-hexane were added at 20° C. to a temperature-regulable stirred autoclave, followed by the addition of 500 g of butadiene. Immediately after the addition of the butadiene the temperature of the autoclave was raised to 50° C. and an excess pressure of 1.5 bar was adjusted with $N_2$. Polymerization was then carried out for 8 hours at 50° C. up to the quantitative conversion of the monomer. The 1,4-cis-content of the polymer was 37%.

TABLE 6

| | Silicic Acid Mixture | | |
|---|---|---|---|
| | Polar LiBR[a] | Polar NdBR[b] | Polar NdBR 2[c] |
| Buna VSL 5025-0 HM (LSBR) | 54 | 54 | 54 |
| TSR 5, Defo 700 (NR) | 10 | 10 | 10 |
| Polar modified LiBR | 36 | 0 | 0 |
| Polar modified NdBR 1 | 0 | 36 | 0 |
| Polar modified NdBR 2 | 0 | 0 | 36 |
| Mineral oil* | 37.5 | 37.5 | 37.5 |

TABLE 6-continued

Silicic Acid Mixture

| | Polar LiBR[a)] | Polar NdBR[b)] | Polar NdBR 2[c)] |
|---|---|---|---|
| Vulkasil S******** | 70 | 70 | 70 |
| Silane Si 69********* | 5.6 | 5.6 | 5.6 |
| ZnO RS | 2.5 | 2.5 | 2.5 |
| Stearic acid | 1 | 1 | 1 |
| Antilux 654** | 1.5 | 1.5 | 1.5 |
| Vulkanox HS**** | 1 | 1 | 1 |
| Vulkanox 4020*** | 1 | 1 | 1 |
| Vulkacit CZ****** | 1.8 | 1.8 | 1.8 |
| Vulkacit D******* | 2 | 2 | 2 |
| Sulfur | 1.5 | 1.5 | 1.5 |
| Mixture Properties, DIN 53523 | | | |
| Mooney Viscosity ML1 + 4 @ 100° C. | >200 | 67 | 61 |
| Vulcanization Properties, ISO 37 | | | |
| Strength, MPa | 16.8 | 16.5 | 18.5 |
| Elongation at break, % | 260 | 486 | 532 |
| Stress value 100%, MPa | 5.1 | 2.3 | 2.3 |
| Stress value 300%, MPa | n.m. | 8.3 | 8.1 |
| Hardness 23° C., Shore A | 66 | 62 | 63 |
| Hardness 70° C., Shore A 70 | 65 | 62 | 62 |
| Elasticity 23° C., % | 32 | 41 | 42 |
| Elasticity 70° C., % | 48 | 58 | 58 |
| Roelig 10 Hz, DIN 53513 | | | |
| tan delta-20° C. | 0.573 | 0.606 | 0.619 |
| 0 | 0.372 | 0.317 | 0.314 |
| 23 | 0.228 | 0.182 | 0.167 |
| 60 | 0.132 | 0.110 | 0.106 |

TABLE 7

Carbon black mixture

| | Polar LiBR[a)] | Polar NdBR 1[b)] | Polar NdBR 2[c)] | Polar NdBR 3[d)] | Polar NdBR 4[e)] |
|---|---|---|---|---|---|
| Buna VSL 5025-0 HM (LSBR) | 60 | 60 | 60 | 60 | 60 |
| Polar modified LiBR | 40 | 0 | 0 | 0 | 0 |
| Polar modified NdBR 1 | 0 | 40 | 0 | 0 | 0 |
| Polar modified NdBR 2 | 0 | 0 | 40 | 0 | 0 |
| Polar modified NdBR 3 | 0 | 0 | 0 | 40 | 0 |
| Polar modified NdBR 4 | 0 | 0 | 0 | 0 | 40 |
| Carbon black N 234 | 50 | 50 | 50 | 50 | 50 |
| Mineral oil* | 5 | 5 | 5 | 5 | 5 |
| ZnO RS | 3 | 3 | 3 | 3 | 3 |
| Stearic acid | 2 | 2 | 2 | 2 | 2 |
| Antilux 654** | 1.5 | 1.5 | 1.5 | 1.5 | 1.5 |
| Vulkanox HS**** | 1 | 1 | 1 | 1 | 1 |
| Vulkanox 4020*** | 1 | 1 | 1 | 1 | 1 |
| Vulkacit CZ****** | 1.4 | 1.4 | 1.4 | 1.4 | 1.4 |
| Vulkacit D******* | 0.3 | 0.3 | 0.3 | 0.3 | 0.3 |
| Sulfur | 1.8 | 1.8 | 1.8 | 1.8 | 1.8 |
| Mixture Properties, DIN 53523 | | | | | |
| Mooney Viscosity ML 1 + 4 @ 100° C. | 114 | 93 | 83 | 81 | 82 |
| Vulcanization Properties, ISO 37 | | | | | |
| Strength, Mpa | 18.5 | 20.2 | 21.2 | 22.49 | 22.94 |
| Elongation at break, % | 310 | 376 | 425 | 443 | 427 |
| Stress value 100%, Mpa | 3.8 | 2.9 | 2.7 | 2.62 | 2.6 |
| Stress value 300%, Mpa | 16.4 | 14.8 | 12.9 | 13.25 | 14.1 |
| Hardness 23° C., Shore A | 67 | 68 | 68 | 66.1 | 68.2 |
| Hardness 70° C., Shore A 70 | 62 | 64 | 63 | 63.6 | 65.4 |
| Elasticity 23° C., % | 37 | 42 | 39 | 45.6 | 49.6 |
| Elasticity 70° C., % | 45 | 56 | 54 | 52.6 | 54.5 |
| Roelig, 10 HZ, DIN 53513 | | | | | |
| tan delta-20° C. | 0.352 | 0.475 | 0.456 | 0.393 | 0.373 |
| 0° C. | 0.277 | 0.274 | 0.28 | 0.236 | 0.21 |
| 23° C. | 0.210 | 0.198 | 0.201 | 0.187 | 0.169 |
| 60° C. | 0.163 | 0.145 | 0.144 | 0.141 | 0.13 |

| Polar modified NdBR 1 | N,N-dimethylcarbamic acid chloride |
|---|---|
| Polar modified NdBR 2 | Morpholine acid chloride |
| Polar modified NdBR 3 | Epoxidized soy bean oil |
| Polar modified NdBR 4 | Epichlorohydrin |
| Polar modified LiBR | Morpholine-N-carboxylic acid chloride |

*Enerthene 1849-1, mineral oil plasticizer, Mobil Schmierstoff GmbH
**Light-stabilizing wax, Rhein Chemie Rheinau
***Anti-aging agent (6PPD), Bayer AG
****Anti-aging agent (TMQ), Bayer AG
******Sulfenamide accelerator (CBS), Bayer AG
*******Guanidine accelerator (DPG), Bayer AG
********Silicic acid, Bayer AG
*********Silane, Degussa
[a)]modified LiBR from Example 4 (comparison)
[b)]modified NdBR of Example 1a)
[c)]modified NdBR of Example 1b)
[d)]modified NdBR of Example 2a)
[e)]modified NdBR of Example 2b)

Result

The advantages of the modified rare earth metal polybutadienes (NdBR) compared to modified LiBR are clear from these Tables. The processing behavior of the polar modified NdBRs is significantly better (lower Mooney viscosities of the mixtures). The mechanical property profile is likewise improved (vulcanizate properties) and the dynamic behavior according to Roelig shows clear advantages (larger values) at low temperatures, which is usually correlated with the traction of the tires on wet road surfaces. Furthermore, lower values are obtained at high temperatures, which can be equated with reduced rolling resistance.

Although the invention has been described in detail in the foregoing for the purpose of illustration, it is to be understood that such detail is solely for that purpose and that variations can be made therein by those skilled in the are without departing from the spirit and scope of the invention except as it may be limited by the claims.

What is claimed is:

1. Modified polymers that are modified along the polymer chain comprising conjugated dienes or on conjugated dienes and vinyl-aromatic compounds having a content of vinyl-aromatic compounds of up to 60 wt. %, a proportion of cis-position double bonds of $\geq 92\%$, a mean molecular weight ($M_w$) of 50,000 to 1,500,000 g/mole, a gel content of $\leq 5\%$ and a degree of modification of 0.05 to 20 wt. %.

2. A process for producing polymers that are modified along the polymer chain comprising conjugated dienes or conjugated dienes and vinyl-aromatic compounds and vinyl-aromatic compounds having a content of vinyl-aromatic compounds of up to 60 wt. %, a proportion of cis-position double bonds of ≧92%, a mean molecular weight ($M_w$) of 50,000 to 1,500,000 g/mole, a gel content of ≦5% and a degree of modification of 0.05 to 20 wt. %, comprising the steps of (a) polymerizing the conjugated dienes or the conjugated dienes and vinyl-aromatic compounds at temperatures of −30° to 130° C. in the presence of rare earth metal compounds and in the presence of an inert, aliphatic solvent, the water content of the reaction mixture being ≦1,000 ppm, (b) reacting the resulting polymers containing 1.0 to 1,000 mmole/100 g of polymer of active hydrogen atoms with 0.1 to 200 mmole based on 100 g of polymer, of organometallic compounds or with the metals themselves, the metals of the organometallic compounds being selected from the group of alkali metals or alkaline earth metals, in the presence of 0.1 to 200 mmole, based on 100 g of polymer, of compounds capable of forming co-ordinate bonds with the metallized polymer anions, at temperatures of 20° to 2000° C. and (c) reacting at temperatures of 0° to 200° C. the stabilized polymer anions obtained with 0.01 to 200 mmole, based on 100 g of polymer, of organic compounds that contain a group capable of reacting with the polymer anions and at least one polar group in the molecule, wherein the polar groups contain elements of main groups III, IV, V, VI or VII of the PSE or combinations thereof, and the groups capable of reacting with the polymer anions are selected from carbonyl groups, acid chloride groups, metal halide groups, sulfenyl groups, sulfonyl groups, aminochloride groups, groups containing reactive double bonds, epoxide groups, isocyanate groups, nitrile groups and organosilicon and organotin groups, in the presence of aprotic, organic solvents.

3. Rubber molded articles comprising modified polymers that are modified along the polymer chain which comprise conjugated dienes or conjugated dienes and vinyl-aromatic compounds having a content of vinyl-aromatic compounds of up to 60 wt. %, a proportion of cis-position double bonds of ≧92%, a mean molecular weight ($M_w$) of 50,000 to 1,500,000 g/mole, a gel content of ≦5% and a degree of modification of 0.05 to 20 wt. %.

4. A rubber molded article according to claim 3, wherein said rubber article is a tires, tire structural parts, HIPS, ABS plastics and golf balls.

* * * * *